United States Patent [19]
Heger et al.

[11] Patent Number: 5,254,624
[45] Date of Patent: Oct. 19, 1993

[54] COMPATIBLE BLENDS OF AROMATIC POLY(ESTER) CARBONATES AND POLYAMIDES

[75] Inventors: Georg Heger, Krefeld; Erwin Piejko, Bergisch Gladbach; Josef Buekers, Krefeld; Leo Morbitzer, Cologne; Alexander Karbach, Krefeld, all of Fed. Rep. of Germany

[73] Assignee: Bayer Aktiengesellschaft, Leverkusen, Fed. Rep. of Germany

[21] Appl. No.: 851,514

[22] Filed: Mar. 16, 1992

[30] Foreign Application Priority Data

Mar. 30, 1991 [DE] Fed. Rep. of Germany ....... 4110484

[51] Int. Cl.$^5$ ..................... C08L 69/00; C08L 77/00
[52] U.S. Cl. ........................ 525/133; 525/66; 525/148; 525/433
[58] Field of Search ............... 525/66, 133, 148, 433

[56] References Cited

U.S. PATENT DOCUMENTS

4,879,324  11/1989  Lausberg ........................ 525/66

FOREIGN PATENT DOCUMENTS

| 0330015 | 8/1989 | European Pat. Off. |
| 075057 | 4/1988 | Japan |
| 311164 | 12/1989 | Japan |
| 024153 | 2/1991 | Japan |
| 8802387 | 4/1988 | World Int. Prop. O. |
| 9002775 | 3/1990 | World Int. Prop. O. |

OTHER PUBLICATIONS

WPI, AN=78-90332A(50), Derwent Publications Ltd.
Patent Abstracts of Japan, Band 13, Nr. 151 (C-584) (3499), Apr. 12, 1989.

*Primary Examiner*—David J. Buttner
*Attorney, Agent, or Firm*—Connolly & Hutz

[57] ABSTRACT

The invention relates to compatible blends of 94 to 10% by weight aromatic poly(ester) carbonates or polycarbonates, 5 to 70% by weight polyamides and 1 to 20% by weight ester-functional (meth)acrylate polymers and, optionally, elastomers in typical modifying quantities, to a process for the production of these blends and to their use for the production of moldings.

16 Claims, No Drawings

COMPATIBLE BLENDS OF AROMATIC POLY(ESTER) CARBONATES AND POLYAMIDES

This invention relates to blends of partly crystalline or amorphous polyamides, poly(ester) carbonates or polycarbonates, relatively hard (meth)acrylate polymers containing tertiary ester groups and, optionally, elastomers and also typical additives and to the use of these blends for the production of moldings.

Binary molding compounds of polycarbonates and polyamides cannot be processed as thermoplastics without additives. In extruders, the melt foams because the polycarbonate is degraded by the polyamide. J 85/31 224 describes blends of polyamides, polycarbonate, polyacrylate without reactive groups and polyphenylene (ester) ethers which can be processed in extruders. By contrast, EP 315 167 claims blends of polyamide, polycarbonate and an additive based on modified polyoxyalkylenes. However, the molding compounds obtained from both formulations show surface defects which are attributable to the incompatibility of the polycondensates.

According to EP 227 053, compatible blends can be produced from polyamide and aromatic polycarbonate using polycondensates based on glycidyl-terminated bisphenols. J 63/314 270 describes polyamide/polycarbonate blends containing copolymers based on polyolefin/glycidyl methacrylate. The incompatibility of the two systems is reflected in the poor toughness of the blends which rules out broad-spectrum application on an industrial scale.

J 63/33 469 claims blends of polyamide, polycarbonate, a phenoxy resin and m-phenylene diamine. The disadvantage of these blends lies in the use of the low molecular weight additive because health-damaging vapors and odor emissions occur during processing and the end products lack color stability.

According to WO 88/02 387, high-quality polyamide/polycarbonate blends are obtained by the use of compatibilizers (for example polyester amides, ABS, MBS, EPM rubber or polymethyl methacrylate). However, the addition of the soft polymers reduces heat resistance or leads to inadequate improvements in toughness.

Accordingly, the problem addressed by the present invention was to provide thermoplastically processable molding compounds of polyamide and polycarbonate which would not show any delamination, i.e. would have defect-free surfaces. In addition, the blends would combine high toughness with increased heat resistance.

This problem has been solved by the molding compounds according to the invention which consist of polyamide, polycarbonate or polyester carbonate, (meth)acrylate polymers containing tertiary ester groups and, optionally, elastomers.

Accordingly, the present invention relates to mixtures containing

A) 5 to 70% by weight, preferably 10 to 60% by weight and, more preferably, 15 to 50% by weight thermoplastic polyamides, B) 94 to 10% by weight, (at least 10% by weight), preferably 87 to 35% by weight and, more preferably, 80 to 40% by weight thermoplastic aromatic polyester carbonates or polycarbonates, C) 1 to 20% by weight, preferably 3 to 15% by weight and, more preferably, 5 to 10% by weight thermoplastic copolymers of C1) 9.5 to 99.5% by weight, preferably 11 to 89% by weight and, more preferably, 20 to 73.5% by weight $C_{1-4}$ alkyl (meth)acrylates, C2) 0 to 90% by weight, preferably 10 to 80% by weight and, more preferably, 25 to 70% by weight $C_{10-40}$ alkyl (meth)acrylates or (meth)acrylates corresponding to the following general formula

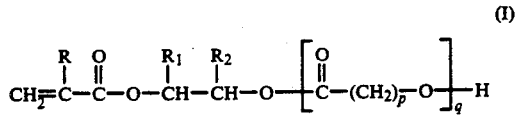

in which
R, $R_1$, $R_2$ represent hydrogen or methyl,
p is a number of 2 to 6 and
q is a number of 2 to 200, C3) 0.5 to 15% by weight, preferably 1 to 12% by weight and, more preferably, 1.5 to 10% by weight vinyl monomers containing acid or tertiary ester groups, the polymers C) optionally containing at least 5% by weight glutarimide units and/or anhydride units, and D) optionally elastomers, so that A), B), C) and, optionally, D) add up to 100% by weight, typical additives, such as lubricants and mold release agents, nucleating agents, plasticizers, stabilizers, UV or light stabilizers, heat stabilizers, fillers and reinforcing materials, flameproofing agents, antidripping agents and coloring agents, additionally being used in effective quantities, as known from the prior art, for their conventional purposes.

The percentage content of component D) may be from 0 to 30% by weight and is preferably from 5 to 20% by weight.

Polyamides (A)

The polyamide component A) of the molding compounds according to the invention may be selected from any thermoplastic, partly crystalline polyamides, more particularly polyamide-6, polyamide-6,6, -polyamide-4,6, and partly crystalline copolyamides based on these components. Other suitable partly crystalline polyamides are those of which the acid component consists in particular completely or partly (besides adipic acid or ,-caprolactam) of terephthalic acid and/or isophthalic acid and/or suberic acid and/or sebacic acid and/or azelaic acid and/or dodecane dicarboxylic acid and/or adipic acid and/or a cyclohexane dicarboxylic acid, and of which the diamine component consists completely or partly of, in particular, m- and/or p-xylylene diamine and/or hexamethylene diamine and/or 2,2,4- and/or 2,4,4-trimethyl hexamethylene diamine and/or isophorone diamine and of which the compositions are known from the prior art.

Partly crystalline polyamides produced completely or partly from $C_{6-12}$ lactams, optionally using one or more of the starting components mentioned above, are also suitable.

Preferred partly crystalline polyamides A) are polyamide-6, polyamide-4,6, polyamide-6,6 or copolyamides containing only small percentages by weight (up to about 10% by weight) of the co-components. Polyamide-6 and polyamide-6,6 are particularly preferred.

The polyamide component A) may also be an amorphous polyamide. Amorphous polyamides are obtained by polycondensation of diamines, for example ethylene diamine, tetramethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane or mixtures of 4,4'- or 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexylamine, 2,5- and/or 2,6-bis-(aminomethyl)-norbornane and/or 1,4-diaminomethyl cyclohexane, with dicarboxylic acids, for example oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphous copolymers obtained by polycondensation of several monomers are of course also suitable, as are copolymers prepared with addition of aminocarboxylic acids, such as ω-aminocaproic acid, ω-aminoundecanoic acid or ω-aminolauric acid, or lactams thereof.

Particularly suitable amorphous polyamides are polyamides produced from isophthalic acid, hexamethylene diamine and other diamines, such as 4,4'-diaminodicyclohexyl methane, isophorone diamine, 2,2,4- and/or 2,4,4-trimethyl hexamethylene diamine, 2,5- and/or 2,6-bis-(aminomethyl)-norbornane; or from isophthalic acid, 4,4'-diaminodicyclohexyl methane and ε-caprolactam; or from isophthalic acid, 3,3'-dimethyl-4,4'-diaminodicyclohexyl methane and lauric lactam; or from terephthalic acid and the isomer mixture of 2,2,4- and/or 2,4,4-trimethyl hexamethylene diamine.

Instead of using pure 4,4'-diaminodicyclohexyl methane, it is also possible to use mixtures of the position-isomeric diaminodicyclohexyl methanes which consist of
70 to 99 mol-% of the 4,4'-diamino isomer,
1 to 30 mol-% of the 2,4'-diamino isomer,
0 to 2 mol-% of the 2,2'-diamino isomer
and, optionally, correspondingly more highly condensed diamines which are obtained by hydrogenation of technical-quality diaminodiphenyl methane.

The polyamides A may also consist of mixtures of a copolyamide consisting of recurring units derived from adipic acid and hexamethylene diamine and units derived from ε-caprolactam and polyhexamethylene adipic acid amide, as described in DE-OS 37 35 404, or of partly crystalline and amorphous polyamides, in which case the amorphous polyamide component is preferably smaller than the partly crystalline polyamide component.

Partly crystalline polyamides based on polyamide-6, polyamide-6,6 and partly crystalline polyamides based on these principal components with addition of co-components of the type mentioned are preferred.

Polyamides in which the content of terminal amino groups is reduced, for example to below 30 meq/kg, are preferred. This content can be adjusted through corresponding dicarboxylic acid ratios or can be obtained by terminal group modification by acylating reactions of terminal groups, as widely described in the literature.

Polycarbonates/polyester carbonates (B)

The thermoplastic aromatic poly(ester) carbonates suitable as component B) of the blends are synthesized from aromatic diphenols ($b_1$) phosgene and/or optionally dicarboxylic acids ($b_2$).

Examples of diphenols ($b_1$) corresponding to formula (II)

are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, pentamethyl-(hydroxyphenyl)-indanol, α,α,-bis-(hydroxyphenyl)-diisopropyl benzenes and nucleus-alkylated and nucleus-halogenated compounds thereof.

These and other suitable aromatic dihydroxy compounds are described, for example, in U.S. Pat Nos. 3,028,365, 2,999, 835, 3,148,172, 3,271,268, 2,991,273, 3,271,367, 3,780,078, 3,014,891, 2,999,846, in DE-OSS 15 70 703, 20 36 052, 20 63 050, 22 11 957, 24 02 175, 24 02 176, 24 02 177, in FR-PS 1 561 518, in the book by H. Schnell entitled "Chemistry and Physics of Polycarbonates", Polymer Reviews 9, Interscience Publishers, New York, 1964 and in V. Serini, D. Freitag and H. Vernaleken "Polycarbonate aus o,o,o',o'-tetramethyl-bis-phenolensubstituierten Bisphenolen", Angewandte Makromolekulare Chemie 55 (1976), 175–189.

Preferred phenols corresponding to formula (II) are hydroquinone, bis-(4-hydroxyphenyl), 2,2-bis-(4-hydroxyphenyl)-propane, bis-(4-hydroxyphenyl)-sulfide, bis-(4-hydroxyphenyl)-ether, bis-(4-hydroxyphenyl)-ketone, bis-(4-hydroxyphenyl)-sulfone, bis-(4-hydroxyphenyl)-methane, 1,1-bis-(4-hydroxyphenyl)-cyclohexane, α,α,-bis-(4-hydroxyphenyl)-p-diisopropyl benzene, 1,1-bis-(4-hydroxyphenyl)-1-phenyl ethane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane, bis-(3,5-dimethyl-4-hydroxyphenyl)-butane, bis-(3,5-dimethyl-4-hydroxyphenyl) and 1,1,3,4,6-pentamethyl-3-(3,5-dimethyl-4-hydroxyphenyl)-indan-5-ol.

Particularly preferred diphenols corresponding to formula (II) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

2,2-Bis-(4-hydroxyphenyl)-propane and 1,1-bis-(4-hydroxyphenyl)-3,3,5-trimethyl cyclohexane are particularly preferred.

One or more diphenols ($b_1$) may be used. They may be prepared in known manner by condensation of phenols and ketones.

The polycarbonates used may be produced in known manner, preferably by the interfacial process (cf. H. Schnell "Chemistry and Physics of Polycarbonates", Polymer Reviews, Vol. IX, pages 33 et seq., Interscience Publ., 1964). To this end, the diphenols corresponding to formula (II) are dissolved in aqueous alkaline phase. Mixtures of diphenols corresponding to formula (II) are used for the production of copolycarbonates. Chain terminators may be added to regulate molecular weight. The diphenols are then reacted with phosgene by the interfacial condensation method in the presence of an inert organic phase which preferably dissolves polycarbonate. The reaction temperature is in the range from 0° to 40° C.

Small quantities, preferably 0.05 to 2.0 mol-% (based on the diphenols used), of trifunctional or more than trifunctional compounds, particularly those containing three or more than three phenolic hydroxyl groups, may optionally be used in known manner as branching agents to obtain branched polycarbonates. Some of the compounds containing three or more than three phenolic hydroxyl groups which may be used are phloroglucinol, 4,6-dimethyl2,4,6-tri-(4-hydroxyphenyl)-hept-2-ene,4,6-dimethyl-2,4,6-tri-(4-hydroxyphenyl)-heptane,1,3,5-tri-(4-hydroxyphenyl)benzene, 1,1,1-tri-(4-hydroxyphenyl)-ethane, tri-(4-hydroxyphenyl)-phenyl methane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5′-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4′,4″-dihydroxytriphenyl)-methyl)-benzene.

Some of the other trifunctional compounds are 2,4-dihydroxy benzoic acid, trimesic acid, cyanuric chloride and 3,3-bis-(3-methyl-4-hydroxyphenyl)-2-oxo-2,3-dihydroindole.

The 0.05 to 2 mol-% branching agents optionally used may either be initially introduced with the diphenols in the aqueous alkaline phase or may be added in solution in the organic solvent before the phosgenation.

In addition to the diphenols corresponding to formula (II) it is also possible to use mono- and/or bis-chlorocarbonic acid esters thereof which are added in solution in organic solvents. In that case, the quantity of chain terminators and branching agents is determined by the mols of diphenolate structural units of (II); similarly, where chlorocarbonic acid esters are used, the quantity of phosgene may be correspondingly reduced in known manner.

Suitable organic solvents for dissolving the chain terminators and, optionally, the branching agents and the chlorocarbonic acid esters are, for example, methylene chloride, chlorobenzene, acetone, acetonitrile and mixtures of these solvents, more particularly mixtures of methylene chloride and chlorobenzene. The chain terminators and branching agents used may optionally be dissolved in the same solvent.

The organic phase for the interfacial polycondensation may consist, for example, of methylene chloride, chlorobenzene and mixtures of methylene chloride and chlorobenzene.

Aqueous NaOH solution, for example, is used as the aqueous alkaline phase.

The production of the polycarbonates by the interfacial method may be catalyzed in the usual way by such catalysts as tertiary amines, more particularly tertiary aliphatic amines, such as tributyl amine or triethyl amine. The catalysts may be used in quantities of 0.05 to 10 mol-%, based on mols of diphenols used. The catalysts may be added before the beginning of phosgenation or during or even after phosgenation. The polycarbonates are isolated in known manner.

The high molecular weight aromatic polycarbonates may also be produced by the known homogeneous phase process, by the so-called "pyridine process" and by the known melt transesterification process, for example using diphenyl carbonate instead of phosgene.

The polycarbonates used preferably have molecular weights Mw (weight average, as determined by gel chromatography after calibration) of at least 12,000, preferably in the range from 12,000 to 220,000 and more preferably in the range from 20,000 to 100,000. They may be linear or branched and are homopolycarbonates or copolycarbonates based on the diphenols corresponding to formula (II).

Suitable aromatic dicarboxylic acids ($b_2$) optionally used are, for example, oxalic acid, malonic acid, succinic acid, glutaric acid, adipic acid, pimelic acid, suberic acid, azelaic acid, sebacic acid, nonane dicarboxylic acid, decane dicarboxylic acid, dodecane dicarboxylic acid, octadecane dicarboxylic acid, dimethyl malonic acid, dimer fatty acid, 1,4-cyclohexane dicarboxylic acid, tetrahydroterephthalic acid, tetrahydroisophthalic acid, tetrahydrophthalic acid, 3,6-endomethylene tetrahydrophthalic acid, o-, m-, p-phenylene diacetic acid, orthophthalic acid, terephthalic acid, isophthalic acid, tert.-butyl isophthalic acid, 3,3′-diphenyl dicarboxylic acid, 4,4′-diphenyl dicarboxylic acid, 4,4′-benzophenone dicarboxylic acid, 3,4′-benzophenone dicarboxylic acid, 4′-diphenyl ether dicarboxylic acid, 4,4′-diphenyl sulfone dicarboxylic acid, 2,2-bis-(4-carboxyphenyl)-propane, trimethyl-3-phenylindane-4,5′-dicarboxylic acid.

Of the aromatic dicarboxylic acids, terephthalic acid and/or isophthalic acid are particularly preferred.

The polyester carbonates in which the dicarboxylic acids ($b_2$) are present in a quantity of 5 to 98 mol-%, preferably in a quantity of 20 to 50 mol-% and 60 to 95 mol-% and, more preferably, in a quantity of 25 to 45 mol-% and 80 to 95 mol-%, based on the sum of the dicarboxylic acids ($b_2$) and the carbonic acid, are preferred.

Aromatic polyester carbonates may be produced by methods of the type known from the literature for the production of polyester carbonates, for example by processes in homogeneous solution, by the melt transesterification process and by the two-phase interfacial process. Melt transesterification processes are preferred, the two-phase interfacial process being particularly preferred.

Melt transesterification processes (acetate process and phenyl ester process) are described, for example, in U.S. Pat. No. 3,494,885, 4,386,186, 4,661,580, 4,680,371 and 4,680,372, in EP-A 26 120, 26 121, 26 684, 28 030, 39 845, 91 602, 97 970, 79 075, 146 887, 156 103, 234 913, 234 919 and 240 301 and in DE-OSS 1 495 626 and 2 232 877. The two-phase interfacial process is described, for example, in EP-A 68 014, 88 322, 134 898, 151 750, 182 189, 219 708, 272 426, in DE-OSS 2 940 024, 3 007 934, 3 440 020 and in Polymer Reviews, Volume 10, "Condensation Polymers by Interfacial and Solution Methods", Paul. W. Morgan, Interscience Publishers, New York, 1965, Chapter II, page 325, Polyesters.

In the acetate process, bisphenol diacetate or bisphenol and acetanhydride and also aromatic dicarboxylic acid are generally condensed with elimination of acetic acid to form the polyester. In the phenyl ester process, bisphenol, aromatic dicarboxylic acid or diphenyl ester of the aromatic dicarboxylic acid and, optionally, diphenyl carbonate are generally reacted with elimination of phenol and, optionally, $CO_2$ to form the polyester or polyester carbonate.

In the two-phase interfacial process, alkali metal bisphenolate, aromatic dicarboxylic acid dichloride and, optionally, phosgene are generally used as starting materials for the production of polyesters and polyester carbonates. The polyester or the polyester carbonate is produced in this condensation reaction with formation of alkali metal chloride. In general, the salt formed is dissolved in the aqueous phase while the polyester formed or the polycarbonate formed is dissolved in the organic phase. The polyester carbonates are isolated in known manner by removing the organic phase obtained in the interfacial process, washing it until it is neutral and free from electrolyte and then precipitating it, for example from organic phase with addition of a non-solvent, and drying the product obtained.

Uncrosslinked, thermoplastic polymers (C)

Component C) of the molding compounds according to the invention is an unbranched polymer having an average molecular weight $M_w$ (as determined, for example, by scattered light measurement) in the range from 2000 to 500,000 g/mol and preferably in the range from 5000 to 200,000 g/mol and is characterized in that the polymers C) consist of C1) 9.5 to 99.5% by weight, preferably 11 to 89% by weight and, more preferably, 20 to 73.5% by weight $C_{1-4}$ alkyl (meth)acrylates C2) 0 to 90% by weight, preferably 10 to 80% by weight and, more preferably, 25 to 70% by weight $C_{10-40}$ alkyl (meth)acrylates or methacrylates corresponding to general formula (I)

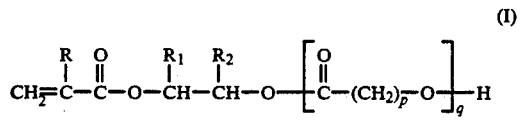

in which
R, $R_1$ and $R_2$ are hydrogen or methyl,
p is a number of 2 to 6 and
q is a number of 2 to 200;
(Preferred alkyl (meth)acrylates C2) are those of $C_{12-30}$ alcohols, preferably $C_{14-28}$ alcohols and, more preferably, $C_{16-26}$ alcohols. Of the esters corresponding to formula (I), those in which R is hydrogen or methyl, $R_1=R_2=$hydrogen, p=5 and q=8 to 30, are preferred. These esters are known, for example, from U.S. Pat. No. 3,655,631.)

C3) 0.5 to 15% by weight, preferably 1 to 12% by weight and, more preferably, 1.5 to 10% by weight vinyl monomers containing acid or tertiary ester groups, the polymers C) optionally containing at least 5% by weight glutarimide units.

Preferred vinyl monomers C3) containing acid or tertiary ester groups are (meth)acrylic acid or tertiary esters thereof corresponding to the general formula

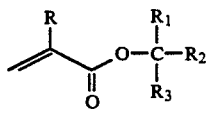

in which
R=H, $CH_3$ and
$R_1$, $R_2$ and $R_3$=alkyl, so that the sum of the carbon atoms in $R_1$, $R_2$ and $R_3$ is from 3 to 9.

Particularly preferred monomers C3) are tert. butyl acrylate, tert. butyl methacrylate, tert. pentyl methacrylate and tert. hexyl acrylate and, optionally, tert. octyl (meth)acrylate; tert. butyl acrylate and tert. butyl methacrylate are most particularly preferred.

Other preferred polymers C) are those containing C1) $C_{1-4}$ alkyl methacrylates. Imidized polyacrylates containing at least 5% by weight glutarimide units are prepared by a reaction between polyacrylates of esters of acrylic or methacrylic acid and ammonia or primary amines, for example in accordance with U.S. Pat. No. 4,246,374. In addition to the imide units, they may also contain corresponding anhydride units.

The thermoplastic polymers C) to be used in accordance with the invention are either already known as such or may be obtained by known methods (see, for example, GB-OS 2,076,171 or DE-AS 2 724 360).

Suitable monomers C1) are methyl methacrylate, ethyl methacrylate, propyl methacrylate, isopropyl methacrylate, butyl methacrylate and isobutyl methacrylate. The preferred monomer C1) is methyl methacrylate.

The $C_{10-40}$ alkyl radicals in the monomers C2) may be linear or branched, unsaturated or saturated; linear, saturated $C_{10-40}$ alkyl radicals are preferred. Suitable alkyl radicals are, for example, octadecyl, 1-eicosanyl and 1-docosanyl. Preferred monomers C2) are, for example, stearyl acrylate, behenyl acrylate or 1-docosanyl acrylate and eicosanyl acrylate and the corresponding esters of methacrylic acid, such as stearyl methacrylate, 1-docosanyl methacrylate and eicosanyl methacrylate.

The uncrosslinked polymers C) of the monomers C1) and, optionally, C2) and of the monomers C3) preferably have brittleness temperatures of more than +2° C. and preferably more than +10° C.

In the case of pure amorphous polymers, the brittleness temperatures may be equated with their glass temperatures (for the glass temperatures of polymers, see "Polymer Handbook", 2nd Edition, Wiley & Sons, New York 1975, pages III/139 et seq.). However, beyond certain C-chain lengths of the alcohol radicals of the monomers C2) and certain percentage contents of the monomers C2), polymers containing the monomers C2) may be present in partly crystalline form. In these cases, the brittleness of the polymers is also influenced by the quantity of the crystalline components and their melt temperature (for the brittleness temperatures of homo/poly(meth)acrylates, see H. G. Elias "Makromoleküle", Hüthig & Wepf, Basel-Heidelberg 1971, page 313; for the glass and melting temperatures of copolymers containing monomers capable of crystallization (with the examples octadecyl acrylate/methyl methacrylate), see E. F. Jordan jr., B. Artymyshyn, A. Speca, A. N. Wrigley, J. Polym. Sci. A-1, Vol. 1, 3319–3365 (1971) and E. F. Jordan jr., ibid, 3367–3378).

The composition of the polymers C) containing monomers C2), which may have different C-chain lengths of the alcohol radicals, should preferably be selected so that the glass temperature of the polymers is above +2° C. and preferably above +10° C. or in such a way that the C-chain lengths of the alcohol radicals of the monomers C2) are so considerable and the percentage contents of these monomers in the polymer are so high that the polymers contain crystalline phases and, accordingly, are not elastomers.

The glass temperatures of the polymers and the presence of crystalline phases may be determined, for example, by differential thermoanalysis.

Component C) may be produced by any methods of polymerization in bulk, solution, water, suspension, dispersion and emulsion, the polymerization reaction being initiated by radicals, heat or ionically. Component C is preferably produced in bulk or in emulsion.

In the preferred case of emulsion polymerization, a pre-emulsion is prepared from a solution of the monomers C1) and C3) and, optionally, C2), which contains up to 100% by weight, preferably up to 50% by weight and, more preferably, up to 25% by weight, based on the total weight of the monomers to be polymerized of component C), of an inert organic solvent and an aqueous solution of suitable emulsifiers using stirrers, emulsifying machines, for example homogenizers, or by spraying.

Suitable emulsifying units are known to the expert. Suitable emulsifiers are anionic, cationic or nonionic emulsifiers, such as for example higher aliphatic fatty acids, organic sulfonic acids or sulfuric acid semiesters, alkyl ammonium salts, polyethoxylated phenol derivatives or aliphatic polyethoxylated polyether block polymers. The ratio of the aqueous phase to the organic phase of the pre-emulsion may vary within wide limits, the ratio of aqueous to organic phase preferably being from 9:1 to 1:1. The pre-emulsion is then polymerized under standard conditions continuously, semicontinuously or in batches using typical radical initiators.

The molecular weights of component C) may be established by various measures, such as temperature, monomer concentration, quantity of initiator or by the use of so-called regulators, such as organosulfur compounds, for example mercaptans and/or disulfides, long-chain mercaptans, such as m- or tert.-dodecyl mercaptans, advantageously being used.

The regulators are normally dissolved in the monomer mixture and the mixture is subsequently polymerized. Establishing the molecular weight of vinyl polymers in this way is familiar to the expert.

Elastomers/impact modifiers (D)

Typical representatives of component D) are, for example, olefin rubbers, for example diene rubbers, and also ethylene/propylene copolymers which may optionally contain small quantities of incorporated unconjugated diene monomers (so-called EPDM rubbers), and above all diene monomer/acrylonitrile/copolymer rubbers, diene polymer/ vinyl aryl polymer block copolymers, such as styrene/ butadiene block copolymers.

Other suitable components D) are olefin rubbers containing acidic groups. However, it can be of particular advantage to use carboxyl-functional terpolymers of ethylene, (meth)acrylic acid and butyl acrylate or consisting of ethylene/propylene copolymers or of ethylene/ propylene/butadiene copolymers grafted with maleic anhydride.

According to the invention, rubber-like copolymers of ethylene/vinyl acetate and ethylene/alkyl (meth)acrylate copolymers may also be suitable as component D). The ethylene copolymers containing aminoacrylate monomers described in GB-PS 1,284,489 are also suitable as component D). Copolymers of olefins, acrylates and acid-functional monomers, such as for example (meth)acrylic acid or maleic anhydride, may also be used.

According to the invention, particularly suitable components D) are rubber-like graft polymers, for example graft polymers of o-olefin polymers and carboxylic acid and/or ester graft monomers, copolymers or homopolymers of ethylene, propylene and 1-butene being suitable as the graft bases.

Other suitable graft polymers (elastomers D) are the poly-α-olefin rubber/maleic anhydride adducts known from patent applications DE-A 2 622 876, EP-A 13 941, DE-A 2 622 973, DE-A 2 401 149 and EP-A 9 757, the reaction products of ethylene copolymers with maleic anhydride and dialkyl esters of maleic or fumaric acid known from DE-A 3 335 706, the polyolefin rubbers grafted with unsaturated acids in accordance with FR-PS 1 568 637 (GB-PS 998,439) and the maleic-acid-grafted EPDM rubbers described, for example, in DE-A 2 622 973.

Graft polymers obtained by grafting of styrene monomers and acrylonitrile onto a rubber polymer having a glass transition temperature below 0° C. and preferably below $-20°$ C. are particularly suitable. In this case, rubber polymers are, for example, polybutadiene, butadiene/acrylate copolymers, for example based on butyl acrylate and/or ethylhexyl acrylate, alkyl polyacrylates, particularly those containing 1 to 8 carbon atoms in the alkyl radical, copolymers of butadiene, alkyl acrylates and vinyl alkyl ethers, copolymers of ethylene, propylene and a diene component. The production of rubber-modified copolymers such as these is known (for example from JA 48 850 or U.S. Pat. No. 4,217,424).

The graft polymers of styrene and acrylonitrile on polybutadiene known from DE-A 2 906 222 and copolymers of butadiene and $\alpha,\beta$-unsaturated monomers, such as for example styrene, acrylonitrile, lower alkyl (meth)acrylates, and the known grafted acrylate rubbers are also suitable as component D).

Component D) may also consist, for example, of the multiphase polymers described in DE-A 3 200 070 of a highly crosslinked diene rubber as core, a first shell of crosslinked acrylate rubber (core/shell rubber) and a second shell of a polymer or copolymer of resin-forming monomers from the group consisting of styrene, acrylonitrile, methacrylonitrile, methacrylates or mixtures thereof.

The grafted, partly crosslinked diene and/or acrylate rubbers described in EP-A 0 134 937 and the graft products produced from a crosslinked rubber as the graft base in accordance with DE-A 2 758 615 are also suitable. In this case, preferred rubbers are rubbers based on polybutadiene and/or polyisoprene which may contain up to 40% by weight and preferably up to 10% by weight styrene and/or acrylonitrile and/or acrylates as comonomer. Possible graft monomers may be acrylonitrile, methacrylonitrile, aliphatic esters and amides of acrylic and methacrylic acid containing up to 22 carbon atoms.

Particularly high-quality molding compounds according to the invention are obtained where partly crosslinked particulate graft polymers are used as component D). Advantageous particle sizes ($d_{50}$ values) are in the range from 0.05 to 2 $\mu$m, preferably in the range from 0.08 to 0.6 $\mu$m and, more preferably, in the range from 0.15 to 0.5 $\mu$m. The rubbers used for the production of graft polymers such as these are also particulate, at least partly crosslinked and have gel contents (as a measure of the degree of crosslinking) of greater than 30% by weight and preferably greater than 70% by weight.

Graft polymers of the type in question have rubber contents of 55 to 85% by weight and preferably 70 to 80% by weight and contain rubbers from the series of diene rubbers (butadiene, isoprene) and copolymers thereof with styrene, acrylonitrile, alkyl (meth)acrylate, vinyl ethers or from the series of alkyl acrylate rubbers ($C_{1-8}$ alkyl acrylate) and copolymers thereof with diene monomers, styrene, acrylonitrile, alkyl methacrylate, vinyl ester, vinyl ether.

Alkyl acrylate rubbers typically contain small quantities of polyfunctional comonomers which crosslink the acrylate rubbers, for example divinyl benzene, diol bis(- meth)acrylates, bis-acrylamides, acrylamide-methylol derivatives, trivinyl benzene, triallyl cyanurate, triallyl isocyanurate. Rubber bases such as these are known. Particularly suitable acrylate rubber bases have a core/shell structure, more particularly a diene rubber core with a core component of 0.5 to 10% by weight and preferably 2 to 4% by weight.

Particularly suitable monomers grafted onto the rubber bases are alkyl methacrylate, styrene, acrylonitrile, alkyl acrylate, acrylamides, more particularly methyl methacrylate, and combinations of methyl methacrylate and alkyl acrylates or styrene in combination with acrylonitrile.

Particularly suitable and preferred graft polymers D) have rubber contents of $\geq 55\%$ by weight, contain rubber having gel contents of more than 70% by weight, have particle sizes of 0.15 to 0.5 $\mu m$, contain polybutadiene rubber or polybutyl acrylate rubber and corresponding core/shell rubbers (according to DE-A 3 200 070) and contain as graft monomers methyl methacrylate, particularly in combination with n-alkyl acrylate or styrene/acrylonitrile mixtures containing between 5 and 40% by weight acrylonitrile. The graft polymers may all be prepared by known methods of emulsion polymerization.

Standard Additives (E)

Standard additives E), for example lubricants and mold release agents, nucleating agents, plasticizers, stabilizers, flameproofing additives, fillers and reinforcing materials, dyes and also heat stabilizers, antioxidants and/or light stabilizers, may also be added to the blends according to the invention.

These additives may either be added to components A), B), C), D) or to the binary mixtures of A) and C) or A) and D) or B) and C) or B) and D) in the usual quantities before the production of the blends according to the invention or may be subsequently incorporated in the blends according to the invention. The quantity in which the additives are used is gauged in such a way that the additives are able to develop the desired effect in the blend; it may readily be determined by preliminary tests.

The blends according to the invention may be processed by any of the standard methods for the production of moldings. As can be seen from the Examples, the blends according to the invention are distinguished by good toughness and high heat resistance and by defect-free, matt surfaces.

EXAMPLES

Substances used (components) in Tables 1a and 1b

A.I Polyamide-6 having a relative viscosity of 3.1 (as measured on a 1% by weight solution in m-cresol at 25° C.)

A.II Polyamide-6 having a relative viscosity of 4.0 (as measured on a 1% by weight solution in m-cresol at 25° C.)

B. Thermoplastic aromatic polycarbonate based on 2,2-bis-(4-hydroxyphenyl)-propane having a viscosity of 1.28 (as measured on a 0.5% by weight solution in methylene chloride)

C.I A mixture of 600 g methyl methacrylate, 350 g stearyl methacrylate and 50 g tert.-butyl acrylate is emulsified by means of a high-speed stirrer in a solution of 17.9 g of the sodium salt of $C_{14-18}$ alkyl sulfonic acids in 2,007 g water. One eighth of this emulsion is added with stirring to a solution of 1.79 g of the sodium salt of $C_{14-18}$ alkyl sulfonic acids in 214 g water and, after heating to 75° C. in a gentle stream of nitrogen, a solution of 4.3 g potassium peroxodisulfate in 100 g water is added. The rest of the emulsion is uniformly added over a period of 4 hours at 75° C. Polymerization is then completed over a period of 8 hours at 75° C. A latex having a solids content of 30% by weight is obtained. The isolated 20, polymer has an L value of 50.

The L value is defined as $\eta_{rel} - 1/0.005$ ($\eta_{rel}$=relative solution viscosity, as measured in dimethyl formamide at 25° C. and at a concentration of 0.005 g/cm$^3$).

C.II The following monomer mixture was used for the preparation of polymer C.II which was otherwise produced in the same way as C.I:
625 g methyl methacrylate
350 g stearyl methacrylate
25 g tert.-butyl acrylate C.III The following monomer mixture was used for the preparation of polymer C.III which was otherwise produced in the same way as C.I:
550 g methyl methacrylate
350 g stearyl methacrylate
100 g tert.-butyl acrylate C.IV Polymethacrylate containing N-methyl glutarimide units and acid groups according to U.S. Pat. No. 4,246,374 having a glass temperature of 147° C., a heat resistance (Vicat B, DIN 53 460) of 142° C. and a density of 1.21 g/cm$^3$ (Paraloid EXL 4151, a product of Rohm & Haas, Philadelphia, USA).

D.I. Graft polymer produced by grafting 20% by weight of a monomer mixture of 88% by weight methyl methacrylate, 10% by weight n-butyl acrylate and 2% by weight tert.butyl acrylate onto 80% by weight of a coarse-particle polybutadiene rubber latex having a particle size ($d_{50}$ value) of 370 nm and a gel content of 93% by weight.

D.II Graft polymer produced by grafting 20% by weight of a monomer mixture of 90% by weight methyl methacrylate and 10% by weight n-butyl acrylate onto 80% by weight of a coarse-particle polybutadiene rubber latex having a particle size ($d_{50}$ value) of 370 nm and a gel content of 93% by weight.

D.III Acrylate graft rubber (Paraloid EXL 3387, a product of Rohm & Haas, Philadelphia, USA).

TABLE 1a

| Example No. | Composition of the molding compounds (quantities in % by weight) | | | | | | | | | |
|---|---|---|---|---|---|---|---|---|---|---|
| | A.I | A.II | B | C.I | C.II | C.III | C.IV | D.I | D.II | D.III |
| 1* | 39 | — | 43 | — | — | — | — | 18 | — | — |
| 2 | 35 | — | 39 | 8 | — | — | — | 18 | — | — |
| 3 | 35 | — | 39 | — | 8 | — | — | 18 | — | — |
| 4* | 38.6 | — | 41.4 | — | — | — | — | 9.6 | 10.4 | — |
| 5 | 34.6 | — | 41.4 | 8 | — | — | — | 8.6 | 7.4 | — |
| 6 | 34.6 | — | 41.4 | — | 8 | — | — | 8.6 | 7.4 | — |
| 7 | — | 28 | 57 | — | 15 | — | — | — | — | — |

TABLE 1a-continued

| Composition of the molding compounds (quantities in % by weight) | | | | | | | | | |
|---|---|---|---|---|---|---|---|---|---|
| Example No. | A.I | A.II | B | C.I | C.II | C.III | C.IV | D.I | D.II | D.III |
| 8 | — | 28 | 57 | — | — | 15 | — | — | — | — |
| 9 | — | 30 | 40 | — | — | — | 20 | — | — | 10 |

Production and testing of the molding compounds

Polyamide A), polycarbonate B), copolymer C) and, optionally, elastomer D) were melted in a continuous-action twin-screw extruder and homogenized in the melt. The cylinder temperatures were selected so that melt temperatures of 260° to 340° C. were maintained. The melt strand was spun off into water, granulated and dried.

Test specimens measuring 80 mm×10 mm×4 mm were made from the molding compounds in a standard injection molding machine and were used to determine modulus of elasticity in bending (DIN 53 452), heat resistance (HDT-A for an outer fiber strain of 0.2%, ISO 75) and Izod impact and notched impact strength (ISO 180). For the visual evaluation of incompatibilities, 60 mm×40 mm×4 mm color sample platelets were injection-molded and evaluated for surface defects.

TABLE 1b

| | Test results of the molding compounds | | | | |
|---|---|---|---|---|---|
| Example | E modulus in bending [N/mm²] | $a_n^+$ [kJ/m²] | $a_k^+$ [kJ/m²] | HDT-A [°C.] | Surface |
| 1* | 2115 | 126 | 8 | 104 | Delaminated |
| 2 | 1991 | n.b.$^x$ | 20 | 101 | Matt |
| 3 | 1978 | n.b.$^x$ | 18 | 96 | Matt |
| 4* | 1927 | 6 × n.b.$^x$/64 | 7 | 99 | Delaminated |
| 5 | 1904 | n.b.$^x$ | 21 | 99 | Matt |
| 6 | 1960 | n.b.$^x$ | 23 | 99 | Matt |
| 7 | 2609 | n.b.$^x$ | 8.7 | 109 | Matt |
| 8 | 2617 | 32 | 5.2 | 105 | Matt |
| 9 | n.d.# | n.d.# | 13.3 | 109 | Matt |

*Comparison tests
+$a_n$ = Impact strength
$a_k$ = Notched impact strength
n.d. = Not determined
$^x$n.b. = not broken Examples 7 and 8 show that, by addition of component C), polycarbonate and polyamide can be processed even without rubber. In a comparison test carried out without any additions of C), expanded strands were obtained from the extruder.

Substances used (components) in Tables 2a and 2b

C.V Copolymer of 95% by weight methyl methacrylate and 5% by weight tert.-butyl acrylate produced by aqueous emulsion polymerization C.VI (Comparison polymer)

A mixture of 650 g methyl methacrylate and 350 g stearyl methacrylate is emulsified by means of a high-speed stirrer in a solution of 17.9 g of the sodium salt of $C_{14-18}$ alkyl sulfonic acids in 2,007 g water. One eighth of this emulsion is added with stirring to a solution of 1.79 g of the sodium salt of $C_{14-18}$ alkyl sulfonic acids in 214 g water and, after heating to 75° C. in a gentle stream of nitrogen, a solution of 4.3 g potassium peroxodisulfate in 100 g water is added. The rest of the emulsion is uniformly added over a period of 4 hours at 75° C. Polymerization is then completed over a period of 8 hours at 75° C. A latex having a solids content of 30% by weight is obtained. The isolated polymer has an L value of 48.

The L value is defined as $\eta_{rel} - 1/0.005$ ($\eta_{rel}$ = relative solution viscosity, as measured in dimethyl formamide at 25° C. and at a concentration of 0.005 g/cm³).

C.VII A mixture of 700 g methyl methacrylate, 250 g of a monomer corresponding to formula (I) with p=5, q=10, R =CH₃, R₁=R₂=H and 50 g tert.-butyl acrylate is emulsified by means of a high-speed stirrer in a solution of 17.9 g of the sodium salt of $C_{14-18}$ alkyl sulfonic acids in 2,007 g water. One eighth of this emulsion is added with stirring to a solution of 1.8 g of the sodium salt of $C_{14-18}$ alkyl sulfonic acids in 214 g water and, after heating to 75° C. in a general stream of nitrogen, a solution of 4.3 g potassium peroxodisulfate in 100 g water is added. The rest of the emulsion is uniformly added over a period of 4 hours at 75° C. Polymerization is then completed over a period of 8 hours at 75° C. A latex having a solids content of 30% by weight is obtained.

C.VIII (Comparison polymer)

The following monomer mixture was used for the preparation of the polymer which was otherwise produced in the same way as C.VII:

700 g methyl methacrylate
250 g of a monomer corresponding to formula (I) with p=5, q=10, R=CH₃, R=R₁=R₂=H 50 g n-butyl acrylate C.IX (Comparison polymer)

The following monomer mixture was used for the preparation of the polymer which was otherwise produced in the same way as C.VII:

504 g styrene
196 g acrylonitrile
250 g of a monomer corresponding to formula (I) with p=5, q=10, R=CH₃, R₁=R₂=H
50 g tert.-butyl acrylate D.IV EPM rubber of ethylene (45% by weight) and propylene grafted with approx. 0.7% by weight maleic anhydride; Exxelor ® VA 1803 (a product of EXXON).

TABLE 1a

| Composition of the molding compounds (quantities in % by weight) | | | | | | | | | |
|---|---|---|---|---|---|---|---|---|---|
| Example No. | A.II | B | C.I | C.V | C.VI | C.IV | C.VII | C.VIII | C.IX | D.IV |
| 10 | 34.2 | 51.3 | — | 5 | — | — | — | — | — | 9.5 |
| 11* | 32.3 | 48.8 | — | — | 10 | — | — | — | — | 8.9 |
| 12 | 32.3 | 48.8 | 10 | — | — | — | — | — | — | 8.9 |
| 13 | 30.0 | 40.0 | — | — | — | 20 | — | — | — | 10 |

TABLE 1a-continued

| Composition of the molding compounds (quantities in % by weight) | | | | | | | | | | |
|---|---|---|---|---|---|---|---|---|---|---|
| Example No. | A.II | B | C.I | C.V | C.VI | C.IV | C.VII | C.VIII | C.IX | D.IV |
| 14 | 34.2 | 51.3 | — | — | — | — | 5 | — | — | 9.5 |
| 15* | 34.2 | 51.3 | — | — | — | — | — | 5 | — | 9.5 |
| 16* | 34.2 | 51.3 | — | — | — | — | — | — | 5 | 9.5 |

TABLE 2b

Test results of the molding compounds

| Example | E modulus in bending [N/mm²] | $a_n^+$ [kJ/m²] | $a_k^+$ [kJ/m²] | HDT-A [°C.] | Surface |
|---|---|---|---|---|---|
| 10 | n.d.# | n.d. | 9.8 | n.d. | Matt |
| 11* | n.d. | n.d. | 4.0 | n.d. | Delaminated |
| 12 | n.d. | n.d. | 22.0 | n.d. | Matt |
| 13 | n.d. | n.d. | 22.0 | 108 | Matt |
| 14 | 2204 | n.b.ˣ | 11.3 | 106 | Matt |
| 15* | 2160 | 12.4 | 4.0 | 109 | Delaminated |
| 16* | 2201 | 25.6 | 4.2 | 105 | Delaminated |

*Comparison tests
+$a_n$ = Impact strength
$a_k$ = Notched impact strength
n.d. = Not determined
ˣn.b. = not broken

What is claimed is:

1. Blends consisting essentially of
   A) 5 to 70% by weight thermoplastic polyamides,
   B) at least 10% by weight thermoplastic aromatic polyester carbonates or polycarbonates,
   C) 1 to 20% by weight thermoplastic copolymers of
   C1) 9.5 to 99.5% by weight $C_{1-4}$ alkyl (meth)acrylates,
   C2) 10 to 80% by weight $C_{10-40}$ alkyl (meth)acrylates or (meth)acrylates corresponding to the following general formula

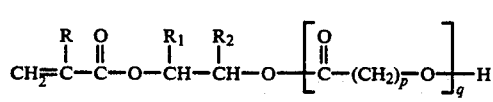

in which
   R, $R_1$, $R_2$ represent hydrogen or methyl,
   p is a number of 2 to 6 and
   q is a number of 2 to 200,
   C3) 0.5 to 15% by weight vinyl monomers containing acid or tertiary ester groups, the polymers C) optionally containing at least 5% by weight glutarimide units, and
   D) 0 to 30% by weight elastomers, A), B), C) and, optionally, D) adding up to 100% by weight, and, optionally,
   E) at least one additive.

2. Blends as claimed in claim 1 containing elastomeric impact modifiers as component D) and wherein component E) consists essentially of at least one material selected from the group consisting of lubricants, mold release agents, nucleating agents, plasticizers, stabilizers, flameproofing additives, fillers, reinforcing materials, dyes, heat stabilizers, antioxidants and light stabilizers.

3. Blends as claimed in claim 1, wherein component A) is present in an amount of about 10 to 60% by weight.

4. Blends as claimed in claim 1, wherein component A) is present in an amount of about 15 to 50% by weight.

5. Blends as claimed in claim 1, wherein component B) is present in an amount of about 10 to 94% by weight.

6. Blends as claimed in claim 1, wherein component B) is present in an amount of about 35 to 87% by weight.

7. Blends as claimed in claim 1, wherein component B) is present in an amount of about 40 to 80% by weight.

8. Blends as claimed in claim 1, wherein component C) is present in an amount of about 3 to 15% by weight.

9. Blends as claimed in claim 1, wherein component C) is present in an amount of about 5 to 10% by weight.

10. Blends as claimed in claim 1, wherein component C1) is present in an amount of about 11 to 89% by weight.

11. Blends as claimed in claim 1, wherein component C1) is present in an amount of about 20 to 73.5% by weight.

12. Blends as claimed in claim 1, wherein component C3) is present in an amount of about 1 to 12% by weight.

13. Blends as claimed in claim 1, wherein component C3) is present in an amount of about 1.5 to 10% by weight.

14. Blends as claimed in claim 1, wherein component D) is present in an amount of about 5 to 20% by weight.

15. Blends as claimed in claim 1, wherein said at least one additive in E) is selected from the group consisting of lubricants, mold release agents, nucleating agents, plasticizers, stabilizers, flameproofing additives, fillers, reinforcing materials, dyes, heat stabilizers, antioxidants and light stabilizers.

16. Blends consisting essentially of
    A) 5 to 70% by weight thermoplastic polyamides, B) at least 10% by weight thermoplastic aromatic polyester carbonates or polycarbonates, C) 1 to 20% by weight thermoplastic copolymers of C1) 9.5 to 99.5% by weight $C_{1-4}$ alkyl (meth)acrylates, C2) 25 to 70% by weight $C_{10-40}$ alkyl (meth) acrylates or (meth)acrylates corresponding to the following general formula

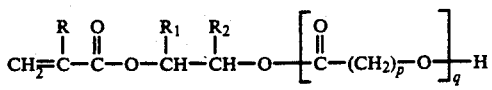

$$CH_2=\overset{R}{\underset{|}{C}}-\overset{O}{\underset{\|}{C}}-O-\overset{R_1}{\underset{|}{CH}}-\overset{R_2}{\underset{|}{CH}}-O-\left[\overset{O}{\underset{\|}{C}}-(CH_2)_p-O\right]_q-H \quad (I)$$

in which
R, $R_1$, $R_2$ represent hydrogen or methyl,
p is a number of 2 to 6 and
q is a number of 2 to 200, C3) 0.5 to 15% by weight vinyl monomers containing acid or tertiary ester groups, the polymers C) optionally containing at least 5% by weight glutarimide units, and D) 0 to 30% by weight elastomers, A), B), C) and, optionally, D) adding up to 100% by weight, and, optionally, E) at least one additive.

* * * * *